Feb. 18, 1964 W. G. ALEXANDER 3,121,861

STORAGE APPARATUS

Filed June 27, 1960

*INVENTOR.*
WILLIAM G. ALEXANDER

United States Patent Office 3,121,861
Patented Feb. 18, 1964

3,121,861
STORAGE APPARATUS

William G. Alexander, La Jolla, Calif., assignor to General Dynamics Corporation, Rochester, N.Y., a corporation of Delaware Filed June 27, 1960, Ser. No. 38,936
2 Claims. (Cl. 340—173)

It is frequently desired that a pictorial display be stored, updated as necessary, and later recalled for study or evaluation. Among the various techniques for approximating this goal are the uses of photographic film, printing, and storage-type cathode ray tubes; none of which were completely satisfactory. Each suffered from the disadvantage that it could not be readily updated, and the last also had the disadvantage that the stored display became derogated with time.

It is therefore the principal object of my invention to provide a novel storage and display apparatus wherein the stored data may be updated as new information becomes available, and may be transmitted or displayed at any time that it is desired to do so.

The attainment of this object and others will be realized from the following specification, taken in conjunction with the drawings in which.

Broadly speaking, my invention contemplates the use of a pickup device to which is applied incoming information in the form of light or electrical signals. Specific cells of this device are thereby energized, and a scanning system notes the addresses of the energized cells. These addresses are then stored in a storage device; subsequent information also being inserted into the storage device. The updated stored information may, at any desired time, be transmitted to any desired location, or may be applied to a display device that produces an updated visual display.

Figure 1:
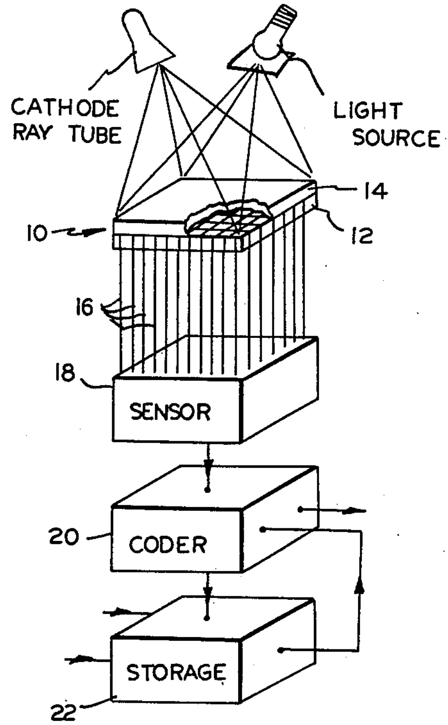
FIGURE 1 illustrates the basic concept of my invention.

FIGURE 1 shows the basic concept of my invention. Pickup device 10 comprises a sheet 12—preferably in mosaic form—of photoconductive material, and a contiguously positioned layer 14 of transparent conductive material, to which a potential is applied. This structure therefore establishes a plurality of cells—each comprising a photoconductive material and a conductive material—each cell having connected thereto an output wire 16, whose function will be later described.

In operation, light from a source—such as a transparency or a cathode ray tube—traverses transparent conductive layer 14, and impinges on selected areas of photoconductive sheet 12. The reduced electrical resistance of the illuminated cells permits the energized cells to produce at their associated wires 16 either a potential or a current—depending upon the desired situation.

In order to sense which cells are energized, a scanner or sensing device 18 analyzes the output of wires 16. This information is applied to a coder 20 which converts the addresses of the energized cells to a code, and applies this coded information to a storage element 22—which may take any convenient form. Thus, when a light pattern is projected onto pickup device 10, the corresponding coded information is stored in unit 22.

As conditions change, hand-drawn information—such as weather data or identifying characters—may be inserted at will. Furthermore, other light patterns from the cathode ray tube or other transparencies may be alternatively or coincidentally projected onto the pickup device, and all this new information is incorporated into the stored data.

It may be desirable to apply to storage element 22 additional information from another, or from a plurality of, pickup device. In this way, storage element 22 always has an updated composite of all the information available up to that time.

In order to produce an updated display, the stored information is applied to a decoder—whose output energizes any suitable display device, one type of which will be hereinafter described.

Figure 2:
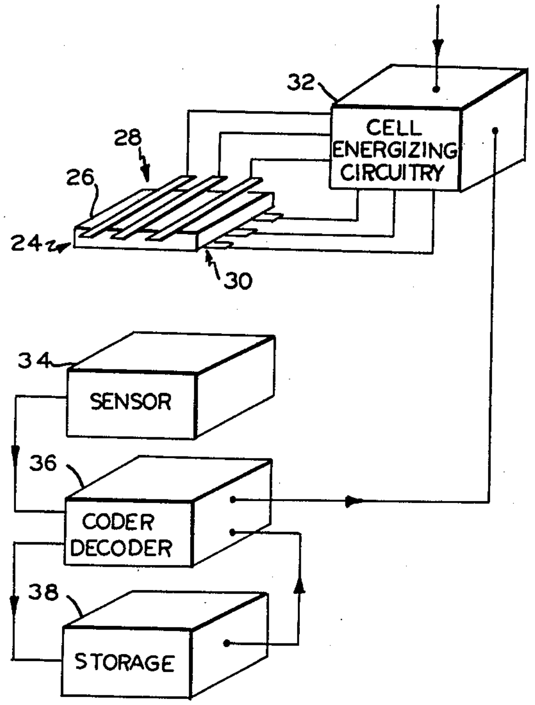
FIGURE 2 illustrates another embodiment thereof.

In the embodiment of my invention thus far described, the input comprises light. FIGURE 2 shows another embodiment wherein the pickup device is energized by electrical signals. In FIGURE 2 pickup device 24 comprises a sheet 26, again preferably in the form of a mosaic, of electroluminescent material that is sandwiched between sets 28 and 30 of crossed grids. Thus, pickup device 24 also comprises a plurality of cells. As is well known, when selected grids are energized, a potential is applied across the electroluminescent material; and selected cells glow. The individual cells of pickup device 24 therefore coact to produce a visual display that corresponds to incoming signals as interpreted by cell energizing circuitry 32.

This display is then scanned by a scanning or sensing unit 34 that senses the addresses of the lighted cells, and—as previously explained—feeds this information to a coder 36 that converts this information to a coded signal that is stored in a storage element 38. Alternatively, the current or potential associated with connecting wires of the energized cells may be sensed as described above.

Thus, either embodiment will store an updated display.

Once the pictorial display has been coded, updated, and stored, it is necessary to reproduce an updated visual display. To achieve this result, the information stored in unit 38 is fed back to decoder 36, where it is decoded and converted back to addresses. These are applied back to the cell energizing circuitry 32, which energizes corresponding cells—thus causing them to glow. In this way device 24 produces an updated visual display from the stored data.

The particular embodiment of the invention illustrated and described herein is illustrative only and the invention includes such other modifications and equivalents as may readily appear to those skilled in the art, within the scope of the appended claims.

I claim:

1. In combination, a pickup device having a plurality of individual light-sensitive cells, means for directing a light pattern upon said cells for energizing selected cells of said pickup device, means for causing subsequent light patterns to establish subsequent patterns of energized cells, means for sensing the addresses of said energized cells, means for storing the addresses of the energized cells, and means for applying said stored addresses to selected portions of said cell energizing means for providing an updated visual display at said pickup device.

2. In combination, a pickup device having a plurality of individual light-sensitive cells, means for energizing selected ones of said cells in accordance with incoming information, means for sensing the addresses of said energized cells, means for converting said addresses to coded signals, storage means for storing said coded signals, decoding means coupled to said storage means for converting said coded signals back to addresses, and means for applying said addresses from said decoding means to selected portions of said cell-energizing means for producing a visual display at said pickup device.

References Cited in the file of this patent

UNITED STATES PATENTS

| | | |
|---|---|---|
| 1,072,152 | Ocampo | Sept. 2, 1913 |
| 2,732,469 | Palmer | Jan. 24, 1956 |
| 2,743,430 | Schultz et al. | Apr. 24, 1956 |
| 2,877,376 | Orthuber | Mar. 10, 1959 |